No. 828,560. PATENTED AUG. 14, 1906.
G. H. LUTHER.
OIL WELL PUMPING POWER.
APPLICATION FILED AUG. 22, 1903.

2 SHEETS—SHEET 1.

Witnesses
Bessie F. Parker
Birdena H. Phillips

Inventor
George H. Luther
by his Attorney

No. 828,560. PATENTED AUG. 14, 1906.
G. H. LUTHER.
OIL WELL PUMPING POWER.
APPLICATION FILED AUG. 22, 1903.
2 SHEETS—SHEET 2.
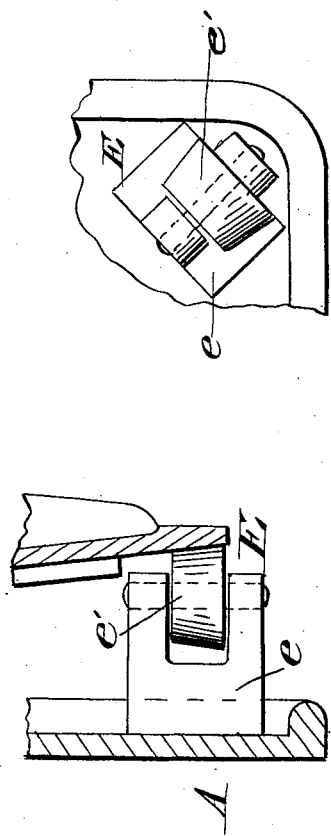
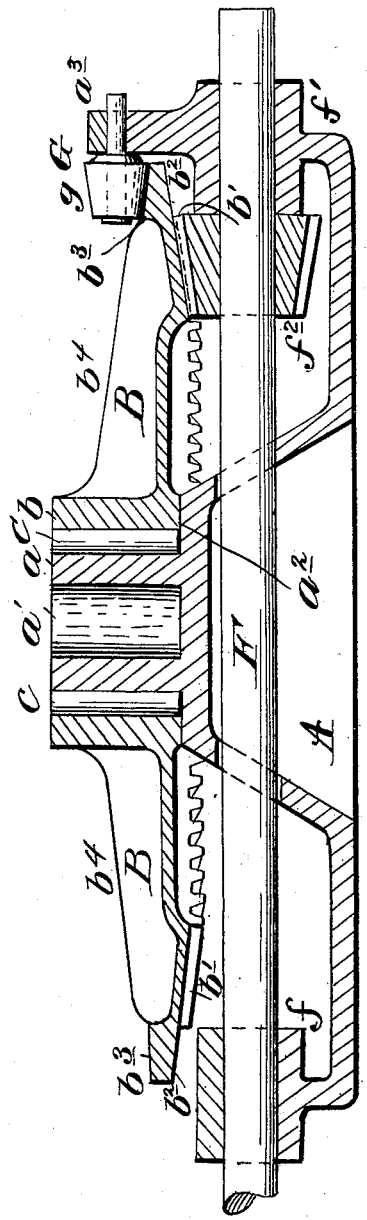
Witnesses
Wm. H. Ourand.
F. L. Ourand
Inventor
George H. Luther,
by W. H. Singleton,
Attorney

UNITED STATES PATENT OFFICE.

GEORGE H. LUTHER, OF OLEAN, NEW YORK.

OIL-WELL PUMPING POWER.

No. 828,560.          Specification of Letters Patent.          Patented Aug. 14, 1906.

Application filed August 22, 1903. Serial No. 170,486.

*To all whom it may concern:*

Be it known that I, GEORGE H. LUTHER, a citizen of the United States, residing at Olean, in the county of Cattaraugus and State of New York, have invented certain new and useful Improvements in Oil-Well Pumping Power; and I do hereby declare the following to be a full, clear, and exact description of the invention, such as will enable others skilled in the art to which it appertains to make and use the same.

This invention relates to a new and useful improvement in pumping powers or devices for operating the pumps of oil-wells; and it consists in the construction hereinafter pointed out.

Figure 1:
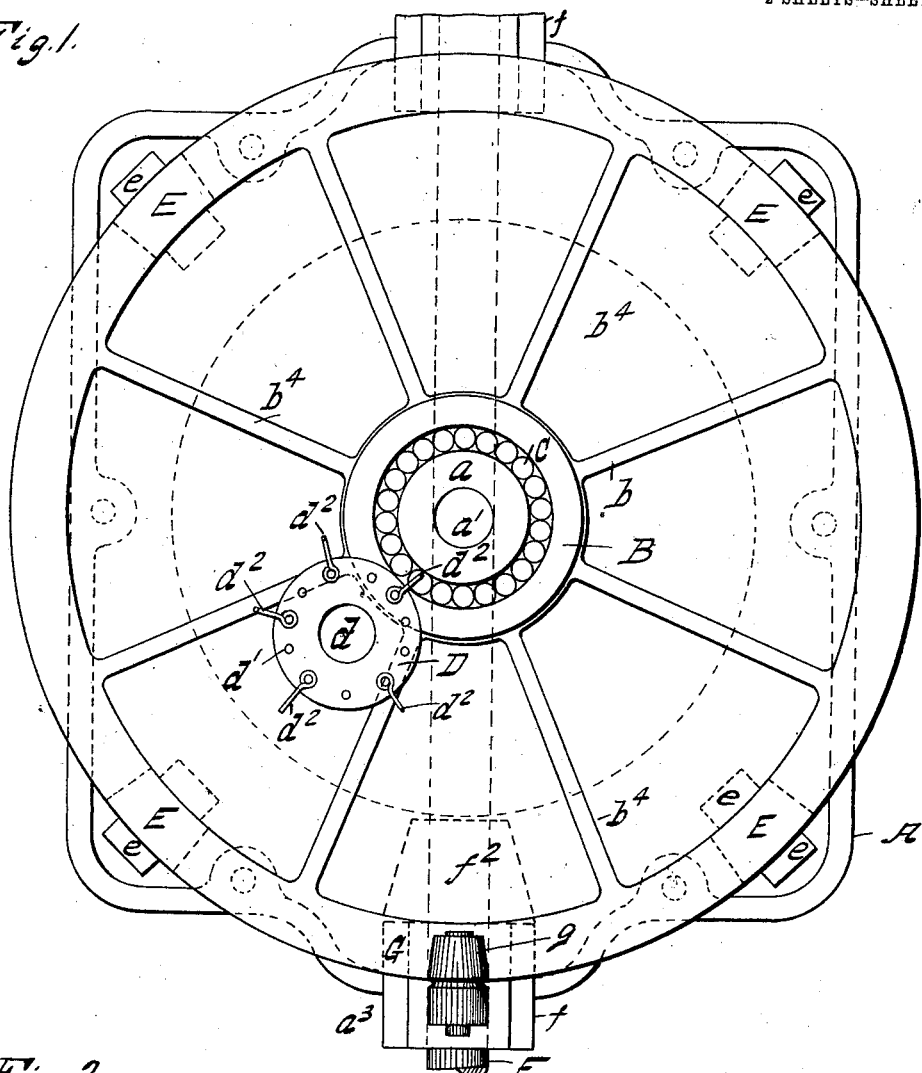
Figure 2:
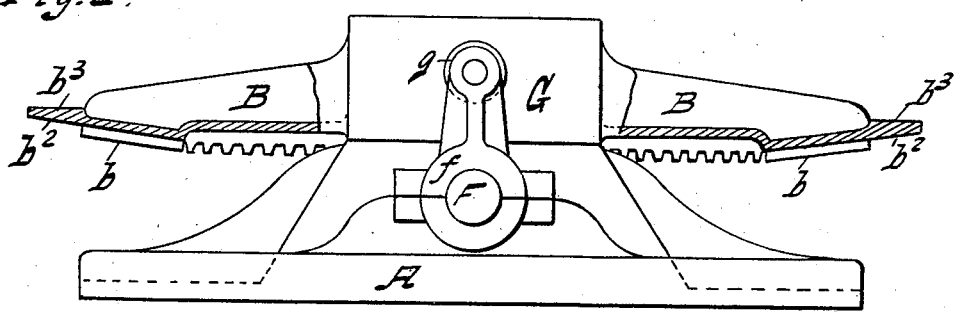

In the annexed drawings, Figure 1 represents a plan view of the device; Fig. 2, an end view, partly in section; Fig. 3, a diametric section; Fig. 4, a detail of one corner, and Fig. 5 another detail showing the corner-support.

In the drawings the letter A represents a suitable frame made quadrilateral. This frame has a bridge-piece at the center, from which extends the center stud $a$, projecting upwardly therefrom and made hollow, as at $a'$. The circular bearing $a^2$ is arranged around the stud $a$. Resting upon this bearing $a^2$ is the hollow hub $b$ of the main wheel B, and between this hub $b$ and the stud $a$ are placed balls or rollers C. This wheel B has on its under side the flaring circular part $b'$ near its circumference and beyond this part $b'$ the plain circular surface or bearing $b^2$, having a continuation of the flare of the toothed part $b'$. Upon the top the wheel B has the plain circumferential bearing $b^3$. The hub and the periphery of the wheel B are connected by spokes $b^4$.

Off from the center the wheel B is provided with a stud $d$, on which loosely fits a disk D, having a number of places $d'$, where are secured the rods $d^2$, which are connected with pumps located at different distances from the wheel B.

At each corner of the frame A is placed a roller E, journaled in suitable posts or bearings $e$, the tread $e'$ of the wheel being fitted to the flare of the surface $b^2$.

In bearings $f\,f'$ of the frame A there is journaled the shaft F, which passes diametrically under the wheel B and under the bridge-piece supporting the stud $a$ and has a beveled pinion $f^2$ to engage the toothed part $b'$ of the wheel.

Just above one bearing $f'$ the frame A has a projection $a^3$, in which is journaled a roller G, having the beveled face $g$, the roller being spaced so far from the bearing $f'$ that the periphery of the wheel A may come below this roller G, the face of the latter bearing upon the bearing $b^3$ of the wheel.

Power is applied to the shaft F, and through the pinion $f^2$ the wheel B is turned. As it turns it carries around the disk D, and through the rods $d^2$ the different pumps are operated. This much of the device is old and well known; but in practice it is found that in operating such a device there is an irregularity of action, especially when only the pumps connected to one side of the disk are in operation, and the device pulls up on one side. To obviate this difficulty, I have applied my improvements. In operating a device such as shown and described in this case the rollers E hold the wheel B truly in a horizontal plane and there is no wabbling, though only a part of the pumps be in operation. At the same time the roller G, bearing on top of the periphery of the wheel, prevents any jumping and holds the wheel firmly to its work.

It will be noted that in the foregoing construction the shaft F, carrying the pinion $f^2$, extends under the wheel B and past the center of the same. In this way a compact structure with a long bearing or bearings remote from each other may be provided for the shaft F. This construction, while advantageous so far as the shaft F is concerned, necessitates a short central bearing for the wheel B. The rollers E and G therefore are peculiarly advantageous in this construction in that through their use in maintaining a uniform angular relation between the wheel B and the axis of the stud the length of the stud is not important.

I am made aware that a horse-power for gin-mills, &c., is old in which there is a frame supported upon three antifriction-rollers and having one on top, the last and one of the lower rollers gearing to operate the mill. In this device the movement is always steady and the same without danger of any wabbling.

In my device, as already stated, according to the varying load upon the device there is a tendency to wabble or pull the device to one side. This I avoid not simply by using anti-friction-rollers, but rollers which take the thrust of the main wheel in opposition to the pull of the pump-rods, as this pull varies. Therefore there are used four of these under rollers, so that at whatever angle or line of direction the pull may come there will be a balanced resistance by at least two rollers, and consequently there will be no wabbling or tipping of the main wheel.

What I claim is—

1. In a power, the combination of a frame provided with the journal-boxes $ff'$ and the bridge-piece arranged between the boxes; a main geared wheel rotatively mounted on said bridge-piece; a connecting means eccentrically mounted on said wheel; a drive-pinion in mesh with said wheel; a shaft on which said pinion is mounted journaled in said boxes and extending under said bridge-piece and by the center of said wheel.

2. In a power, the combination of a frame provided with the journal-boxes $ff'$ and the bridge-piece arranged between said boxes; a main geared wheel rotatively mounted on said bridge-piece; a connecting means eccentrically mounted on said wheel; a drive-pinion in mesh with said wheel; a shaft on which said pinion is mounted journaled in said boxes and extending under said bridge-piece and by the center of said wheel; and rollers operating upon said wheel to maintain it in fixed angular relation to the power-frame.

In testimony whereof I affix my signature in presence of two witnesses.

GEO. H. LUTHER.

Witnesses:
  JOHN BABEL,
  ERNEST A. HUNT.